May 28, 1940.  J. R. HOGE ET AL  2,202,797
METHOD OF AND APPARATUS FOR CURING AND MOLDING SYNTHETIC OR NATURAL RESINS
Filed March 2, 1936  11 Sheets-Sheet 4
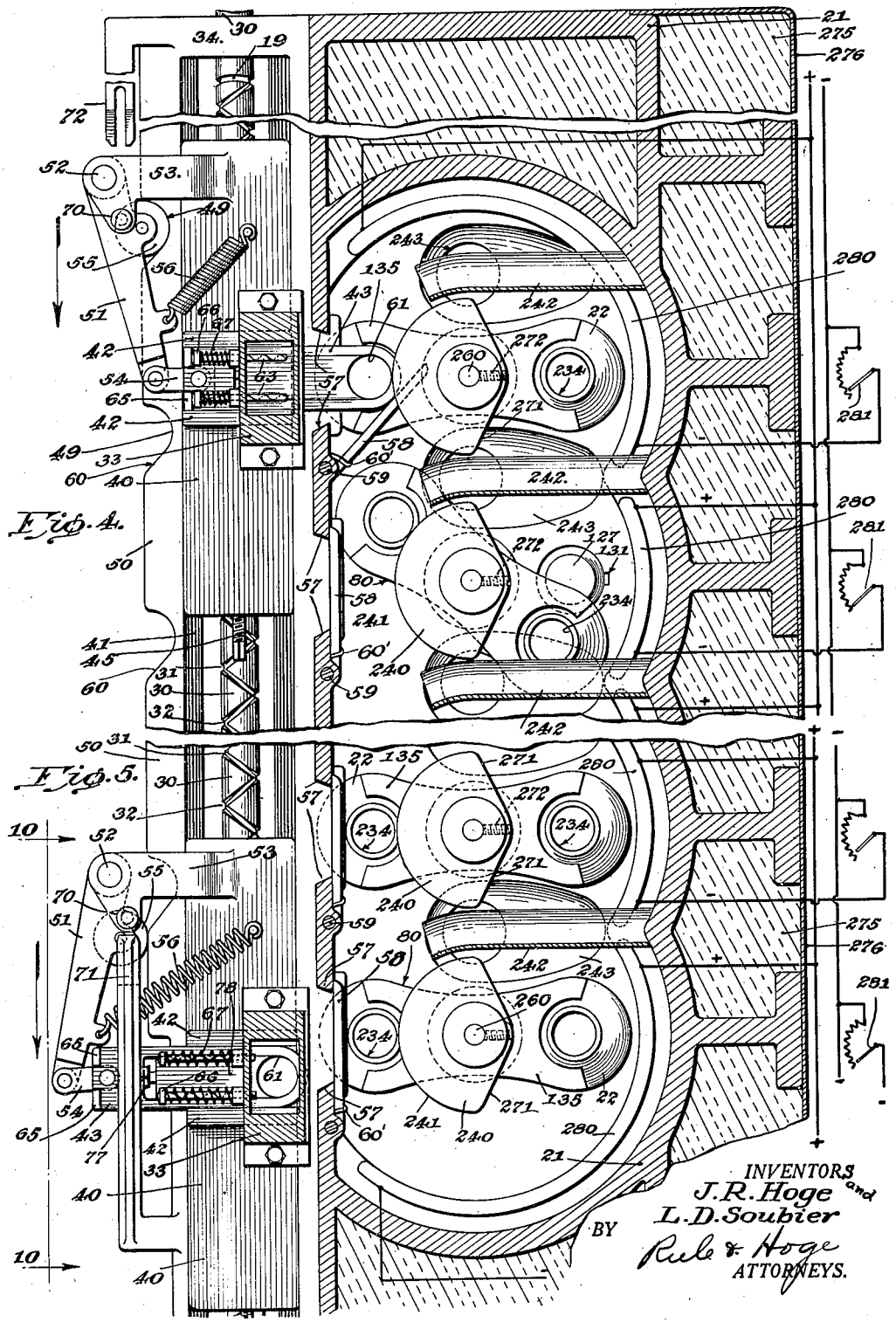
INVENTORS
J. R. Hoge and
L. D. Soubier
BY
Rule & Hoge
ATTORNEYS.

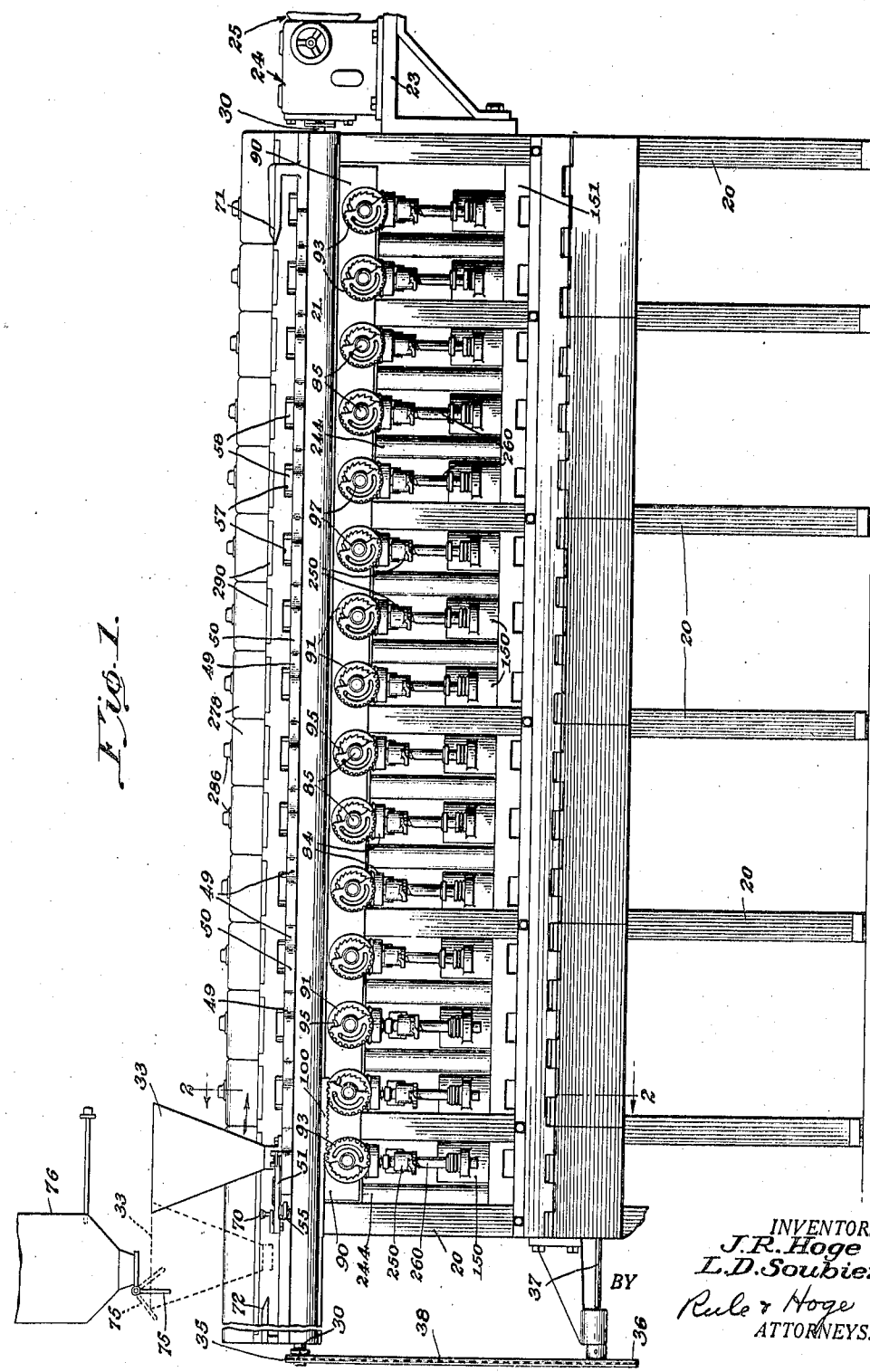

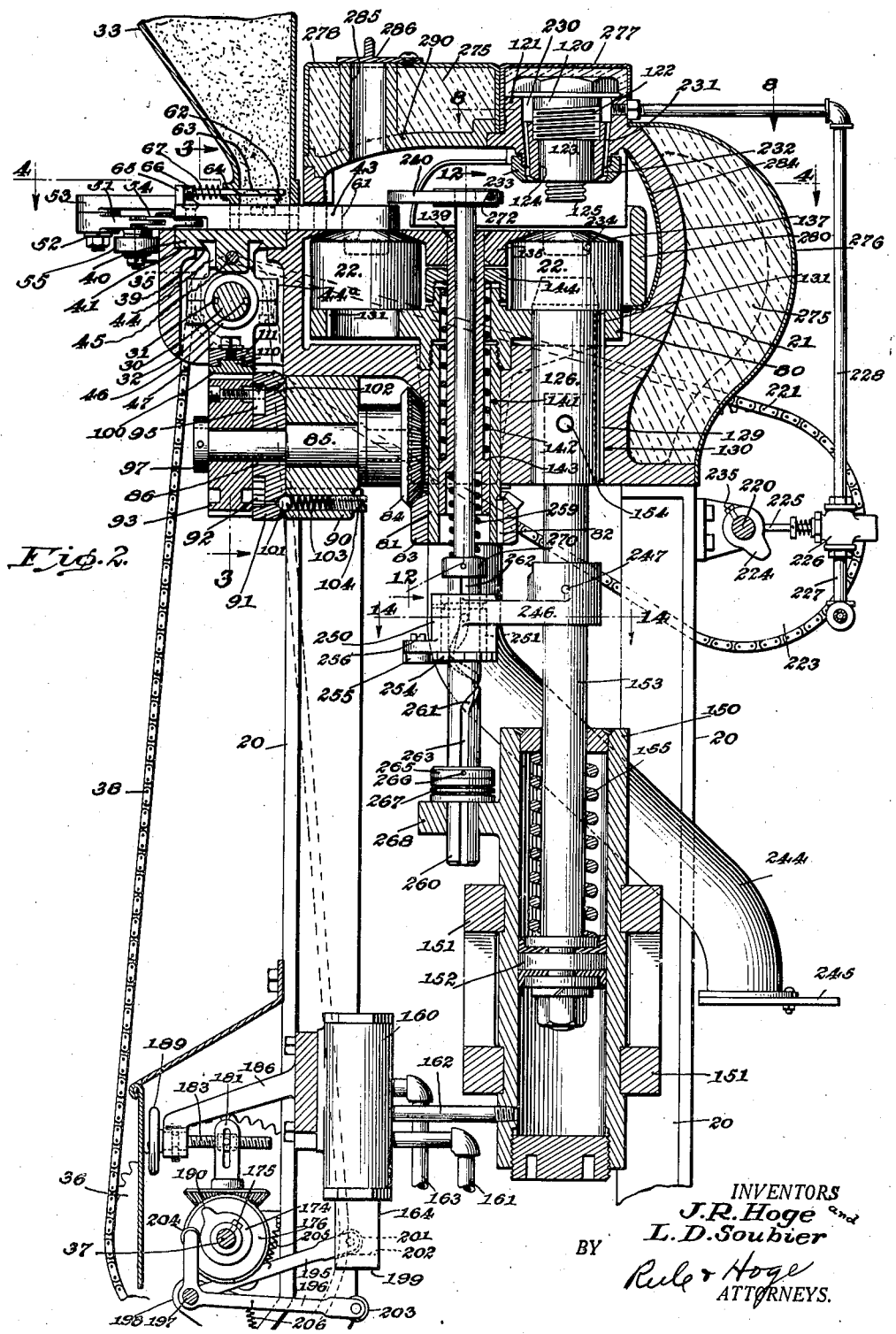

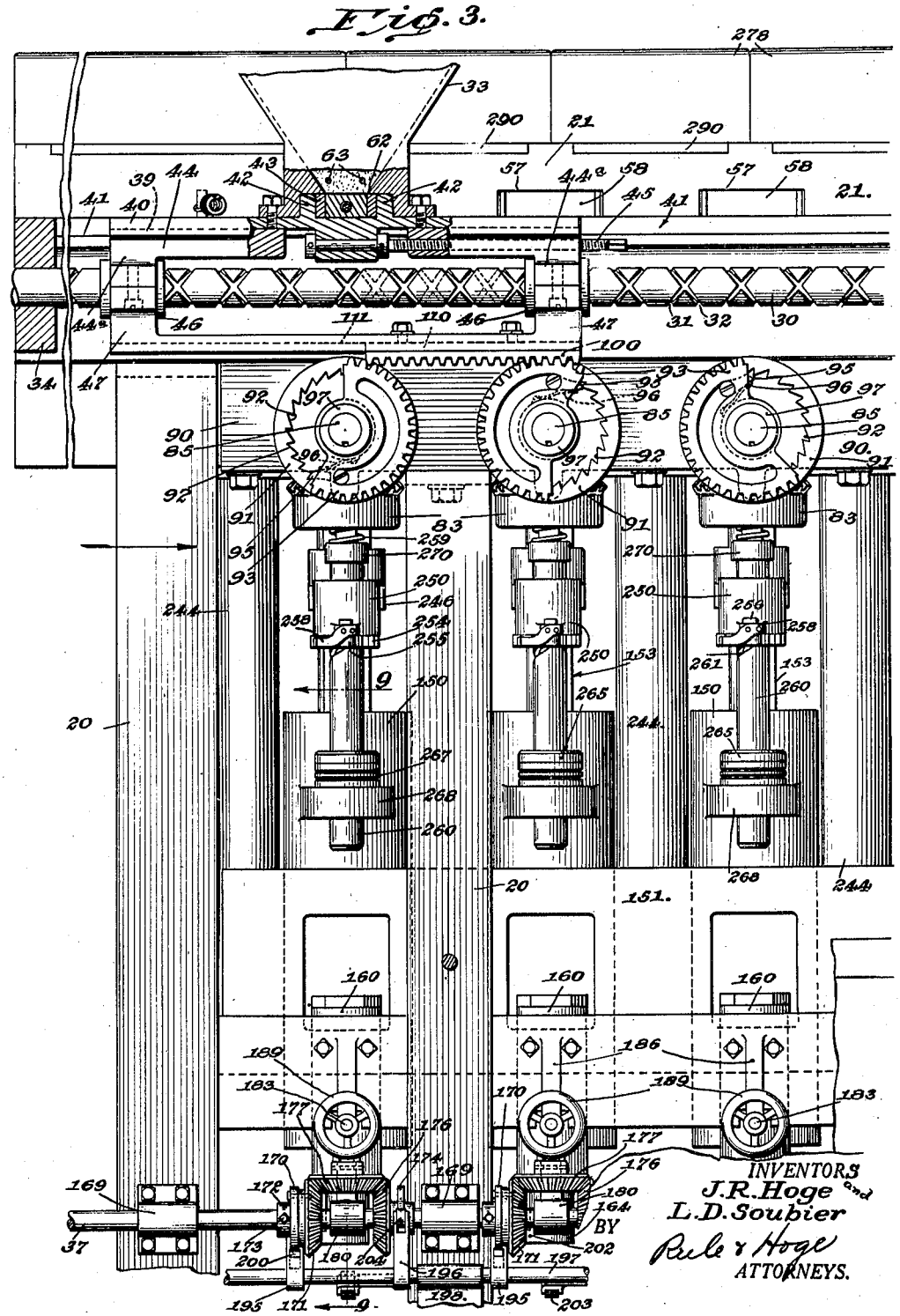

May 28, 1940. J. R. HOGE ET AL 2,202,797
METHOD OF AND APPARATUS FOR CURING AND MOLDING SYNTHETIC OR NATURAL RESINS
Filed March 2, 1936 11 Sheets-Sheet 5
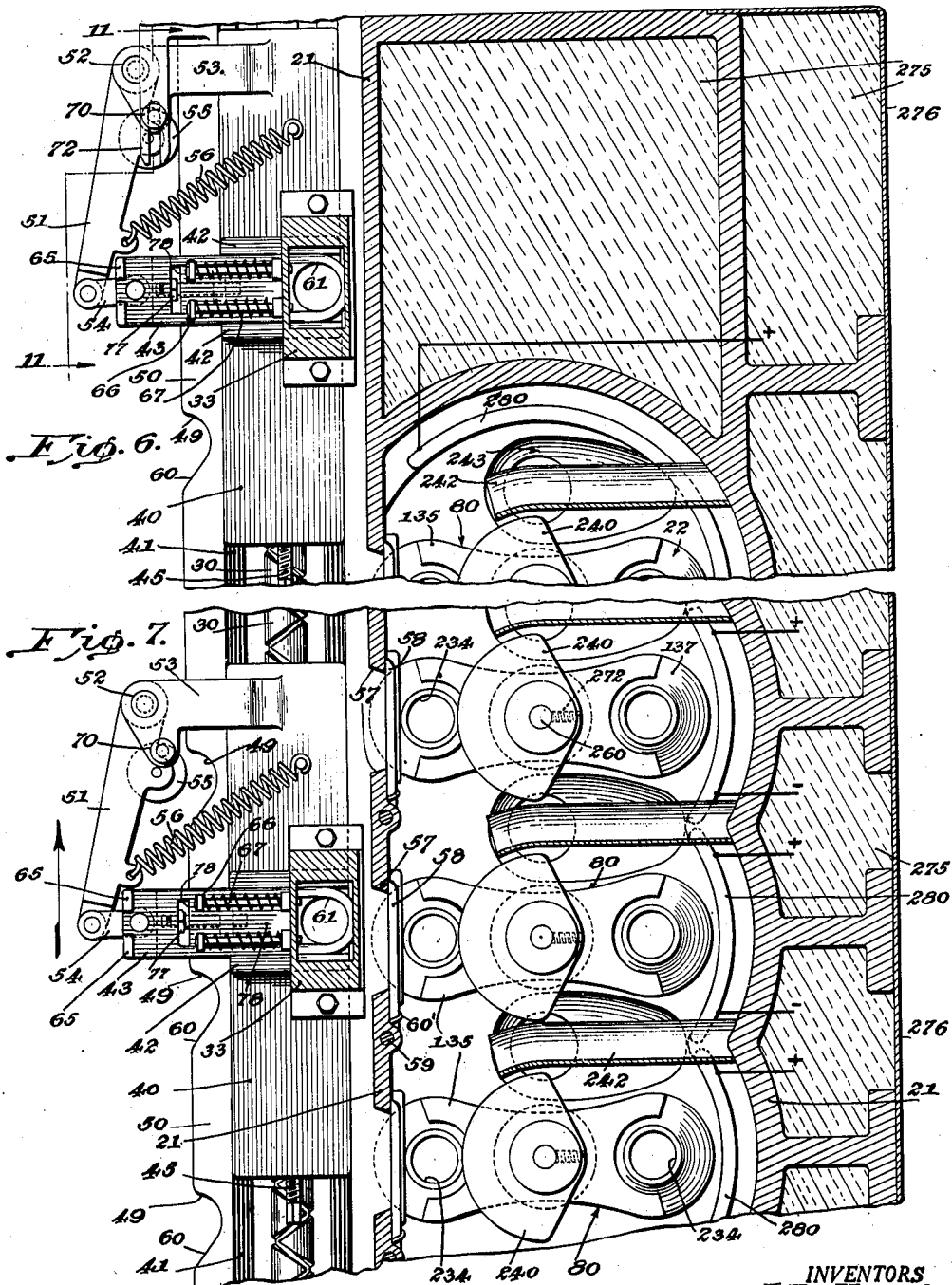
INVENTORS
J. R. Hoge
L. D. Soubier
BY
Rule & Hoge
ATTORNEYS.

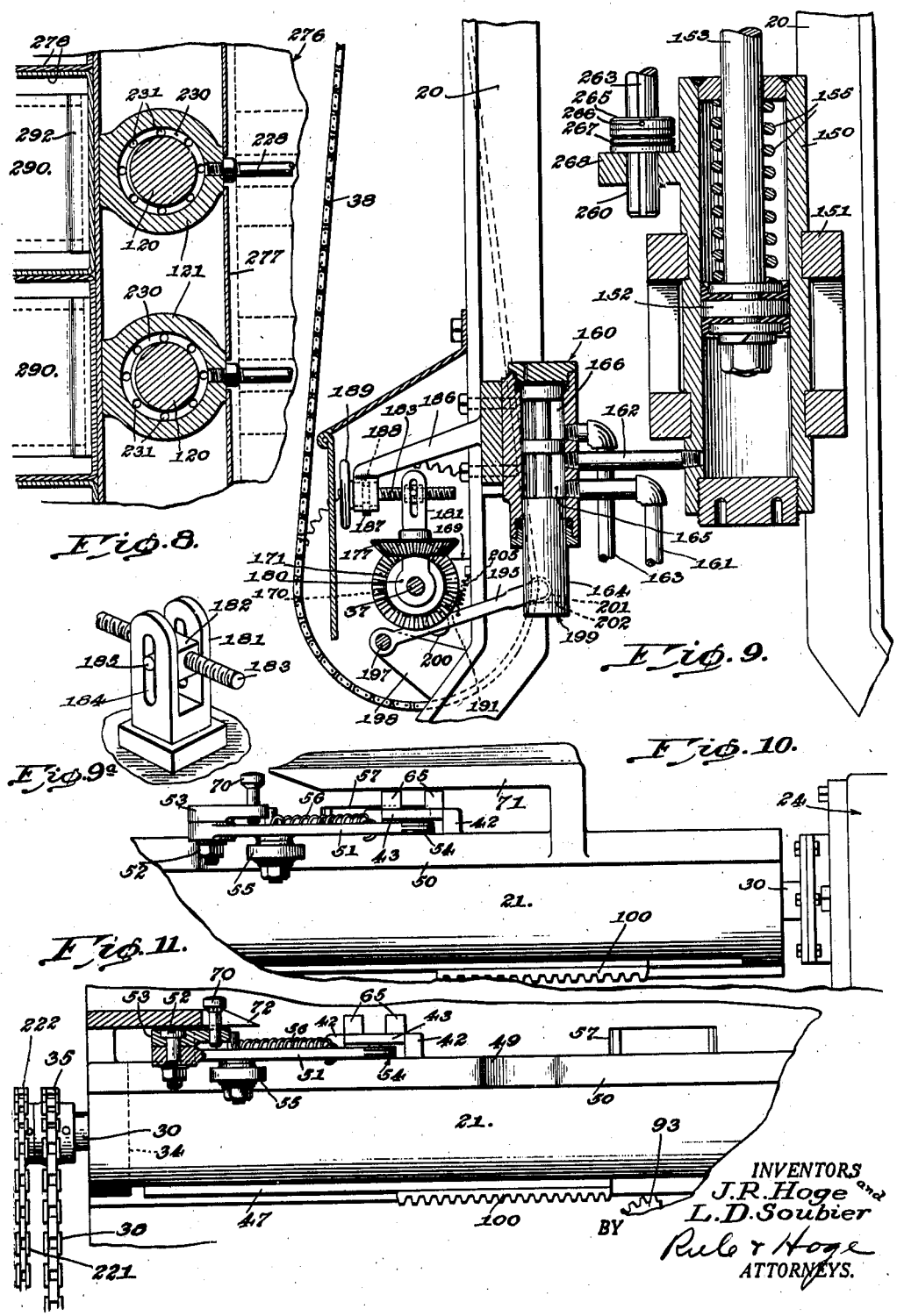

May 28, 1940.　　　J. R. HOGE ET AL　　　2,202,797
METHOD OF AND APPARATUS FOR CURING AND MOLDING SYNTHETIC OR NATURAL RESINS
Filed March 2, 1936　　　11 Sheets-Sheet 7
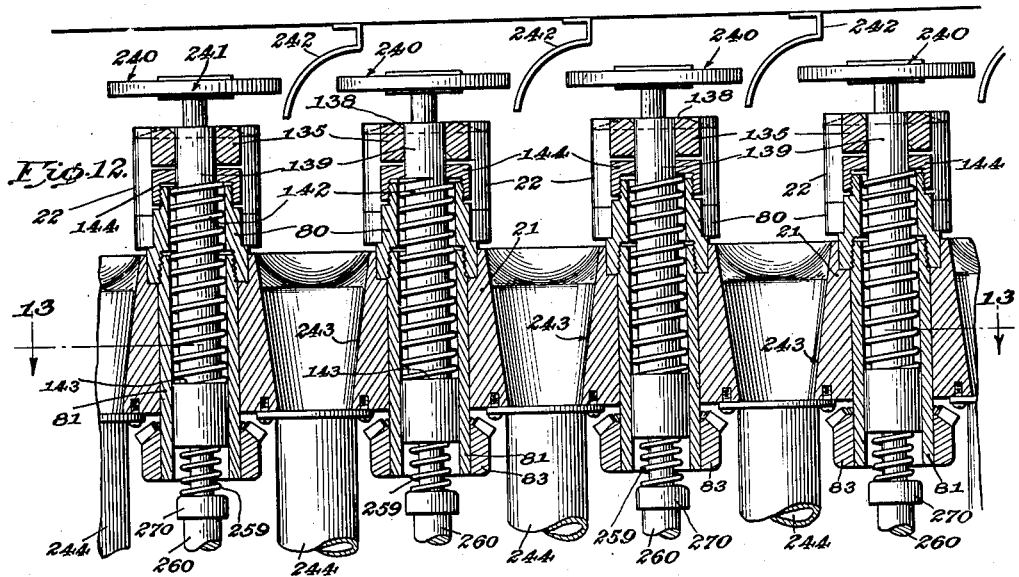
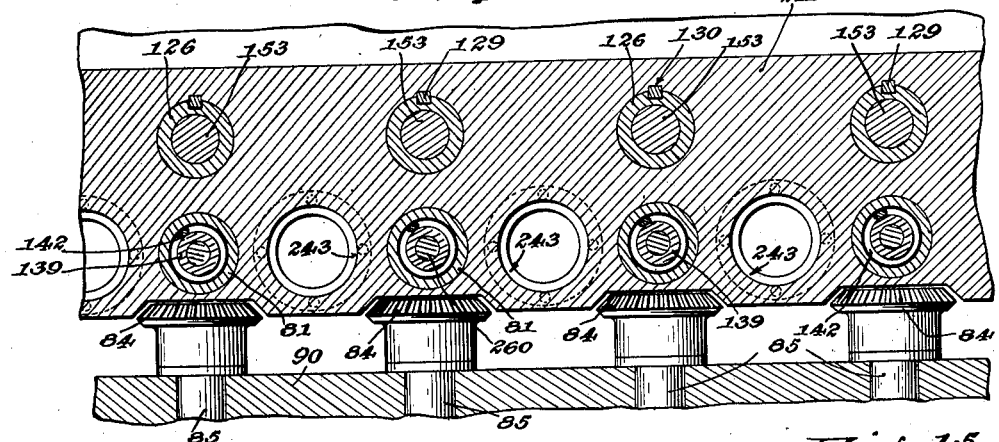
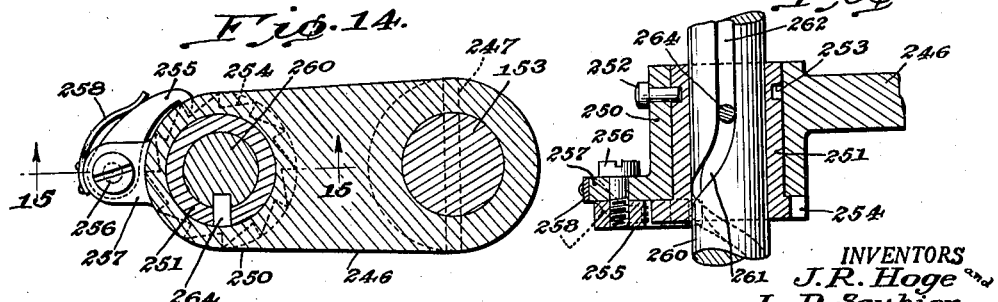
INVENTORS
J. R. Hoge and
L. D. Soubier
BY
Rule & Hoge
ATTORNEYS.

May 28, 1940. J. R. HOGE ET AL 2,202,797
METHOD OF AND APPARATUS FOR CURING AND MOLDING SYNTHETIC OR NATURAL RESINS
Filed March 2, 1936 11 Sheets-Sheet 8
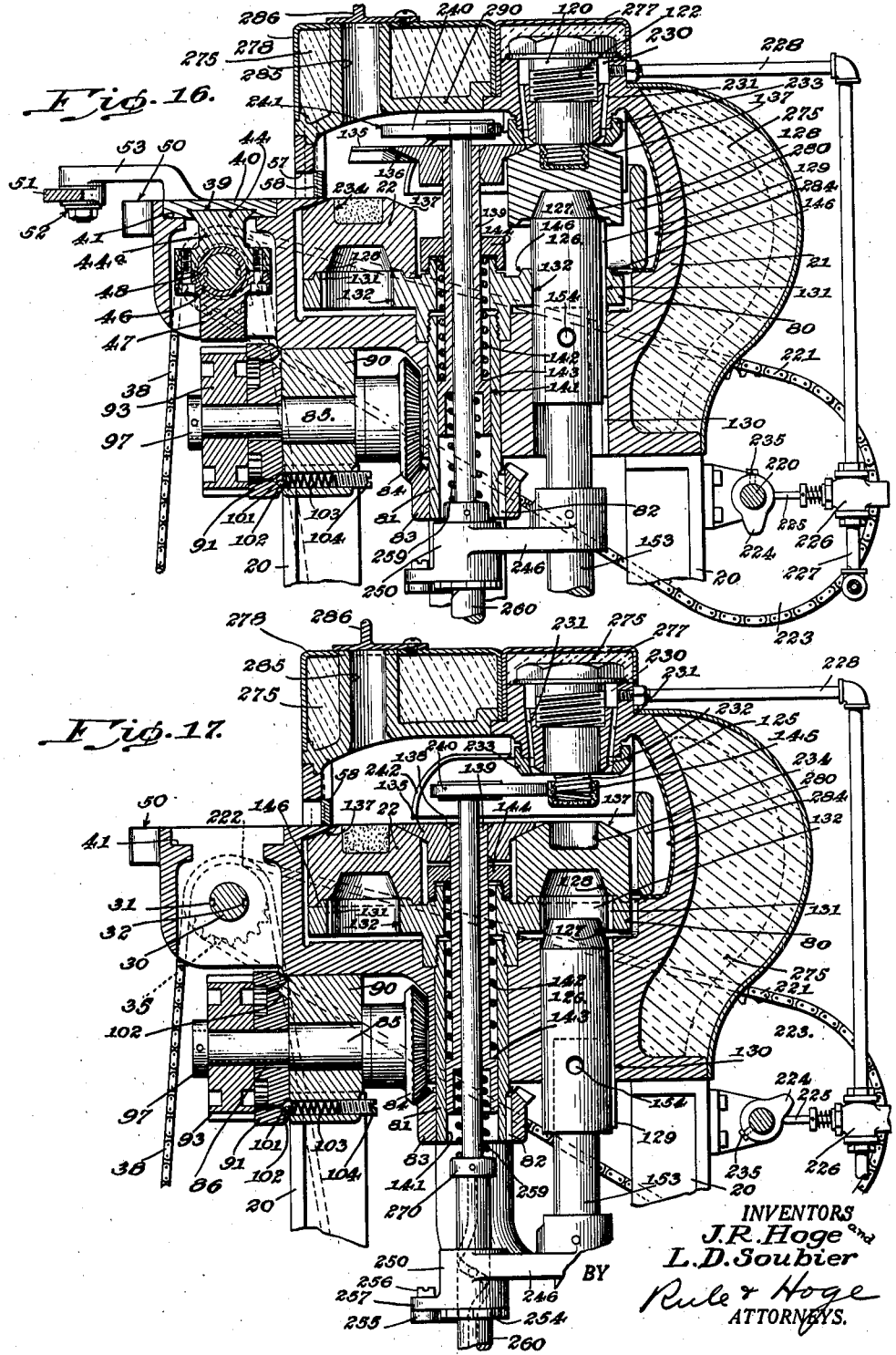
INVENTORS
J. R. Hoge and
L. D. Soubier
BY
Rule & Hoge
ATTORNEYS.

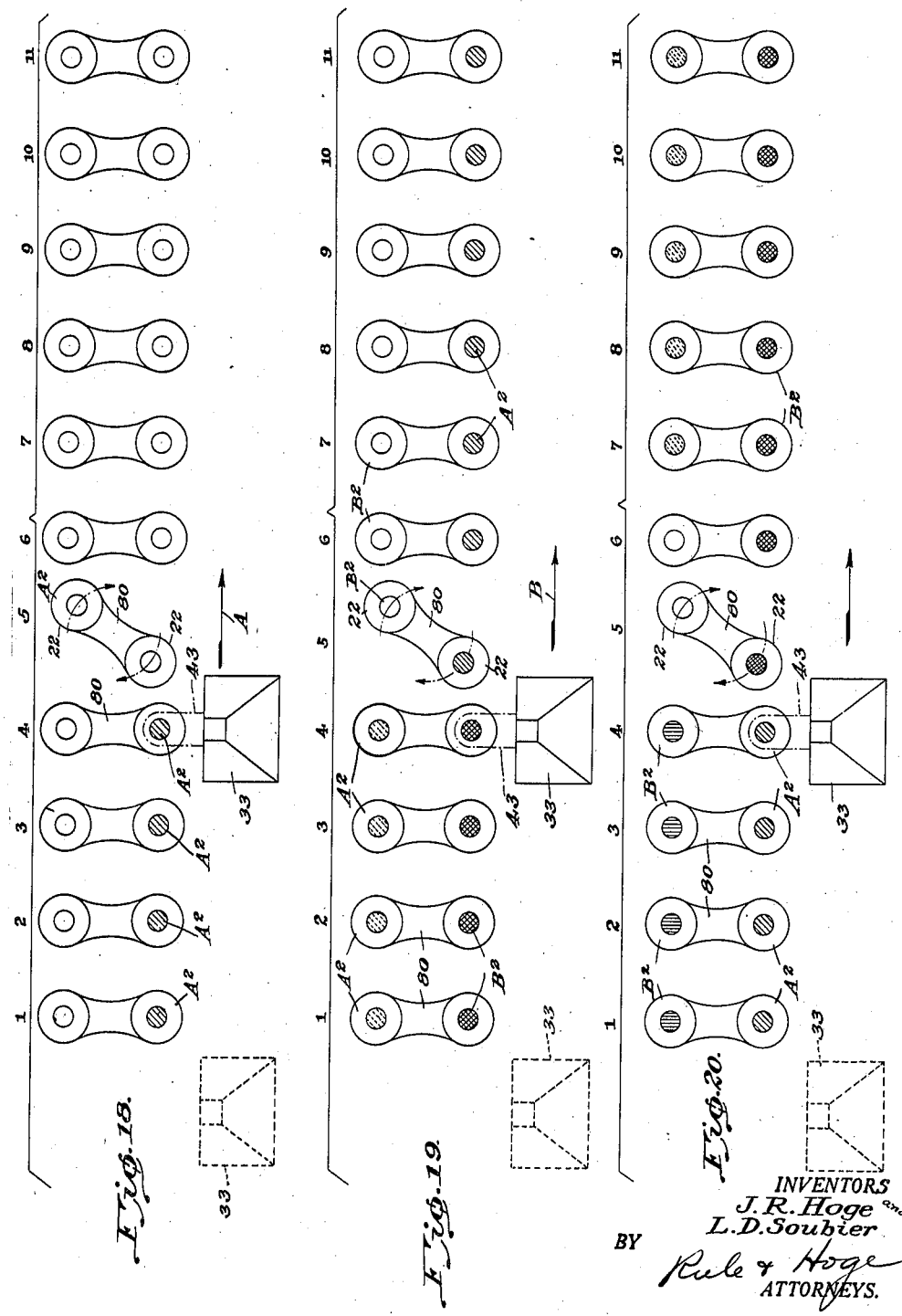

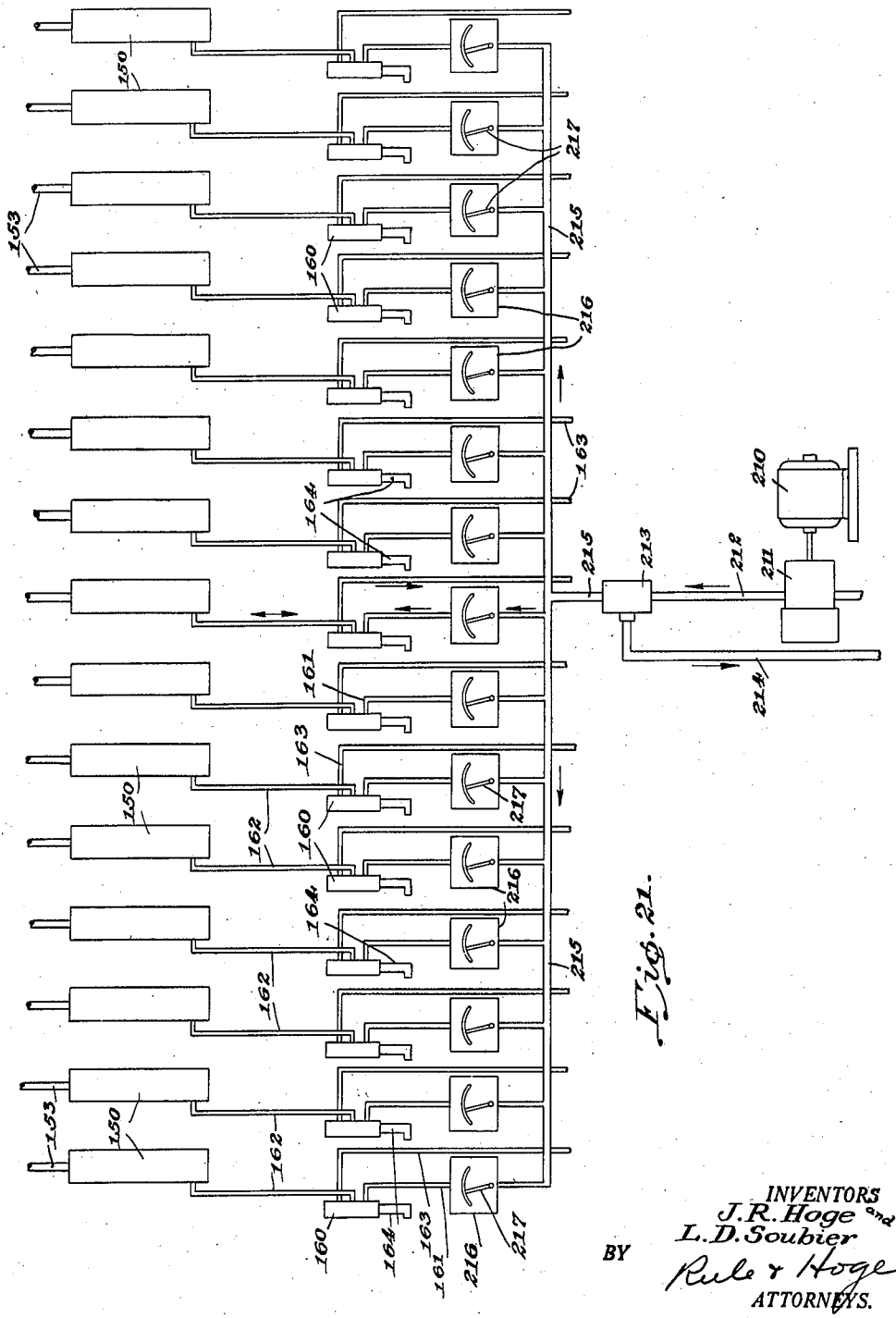

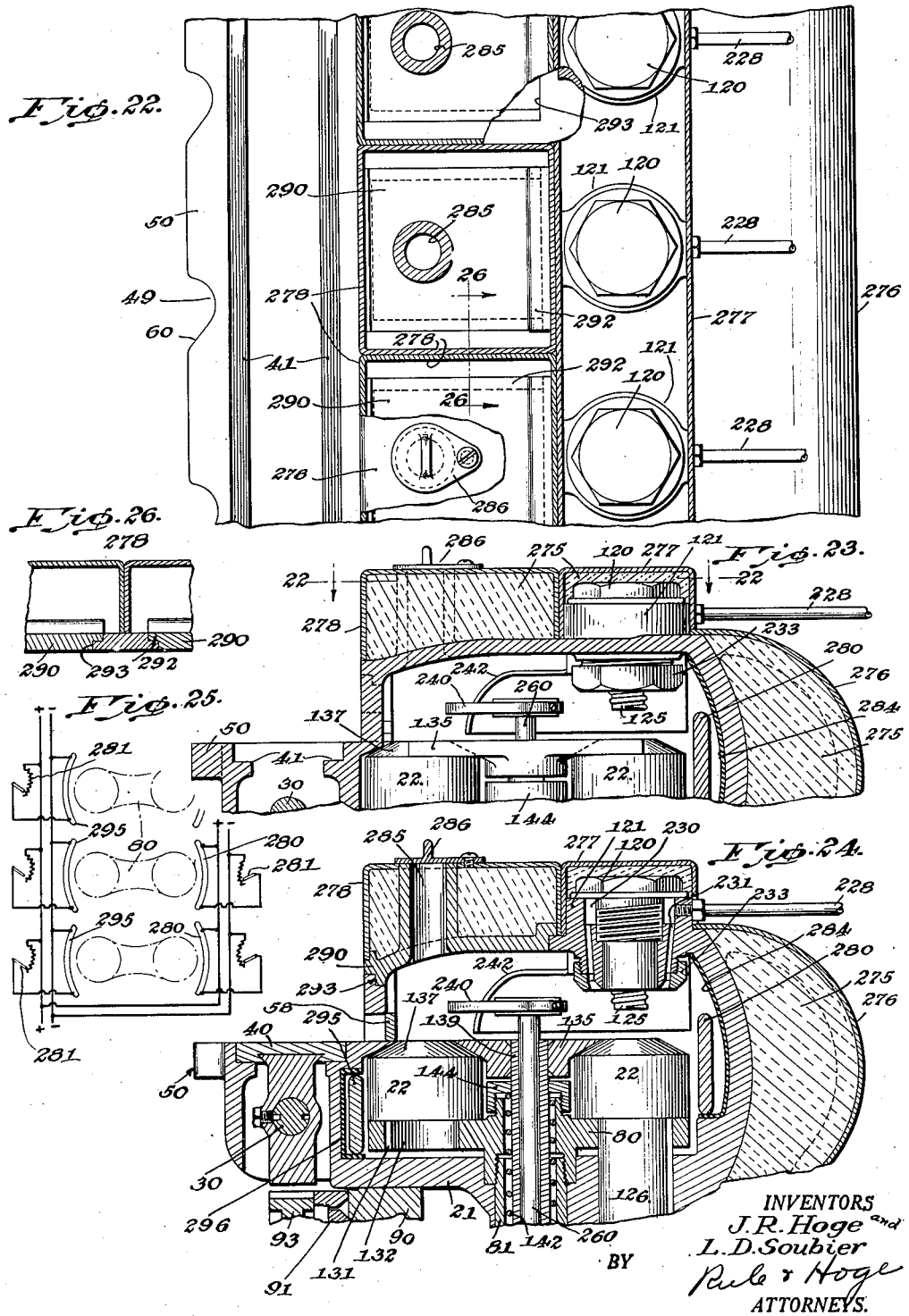

Patented May 28, 1940

2,202,797

UNITED STATES PATENT OFFICE 2,202,797

METHOD OF AND APPARATUS FOR CURING AND MOLDING SYNTHETIC OR NATURAL RESINS

John Ralph Hoge and Leonard D. Soubier, Toledo, Ohio, assignors to Owens-Illinois Glass Company, a corporation of Ohio Application March 2, 1936, Serial No. 66,674

33 Claims. (Cl. 18—5)

This invention relates to a method of and apparatus for curing and molding synthetic or natural resins and other types of materials capable of being molded and cured through the action of pressure and heat, these products being utilized either in the form of powder, grain or pellets.

The present known commercial mechanisms are of two main types, either stationary or rotary, and are worked either by toggles, cams or hydraulic cylinders. All of these known mechanisms are of the type wherein the molding or curing cycle is set or permanent and cannot be varied except by speeding up or slowing down of the machine speed as a whole, and if there is a series of molds or mold heads involved the cycle of one mold head can not in any way be varied relative to the other, nor can its own cycle of operation be altered.

Therefore, among the objects of the present invention is, first, to provide a machine wherein the curing or molding cycle is flexible and adjustable in its own operating phases, not only throughout the entire machine but in each individual head, thus creating a condition wherein the forming cycle of each head may overlap that of the preceding, thereby gaining seconds of time or fractions thereof in production speeds. This overlap, of course, results in increased operating speed, while the flexible operating cycle results in the obtaining of a better control of final results in the production of molded articles.

A further object is the provision of means whereby the operations or phases of mold heads may be overlapped in order that the time interval of the formative period of each head may in effect be reduced, thus allowing a further increase in productive speed, as well as a more flexible control of operations and elimination of the cause of various defects in the articles produced.

Another object is to provide means whereby measured charges of the moldable material may be fed in succession to the molds of each head in timed relation or sequence, together with means whereby any head or series thereof may be left uncharged without in any manner affecting the further operations of the machine.

Also among the objects is the provision of means whereby a charge of material is being preheated in a heated mold of each head while the preceding delivered charge is being molded to final form in another mold on the same head. This provides a condition wherein the time cycle for the final curing of the material may be reduced to a minimum. This particular feature is of importance because of the fact that with synthetic resins especially, a formula may be developed which allows a control of the preheating period, that is, it may be so formulated that the preheating period may be either short or long or of any predetermined duration.

A further object is the provision of independent controls for the heads in order that their functions may be individually regulated and that any of them may be cut out of operation without affecting the operation of the machine as a whole or affecting other heads.

It is also an object to provide novel temperature controlling means whereby the temperature in the zones individual to the molding heads may be regulated and varied at will and independently of each other.

Other objects of this invention will be apparent hereinafter.

Referring to the drawings:

Fig. 1 is a front elevational view of the machine;

Fig. 2 is a sectional elevational view taken along the line 2—2 of Fig. 1;

Fig. 3 is a part sectional front elevational view taken at the left end of the machine and shows the power means as well as the timing mechanism for each head;

Fig. 4 is a sectional plan view taken along the line 4—4 of Fig. 2, showing the relation between the charge feeding mechanism and the molds, the feeding device being shown in discharging position;

Fig. 5 is a sectional plan view taken at the same line as Fig. 4 and showing the charging mechanism withdrawn from the charging position;

Fig. 6 is a sectional plan view at the same line as Fig. 4 and illustrates the cam for unlocking the charging mechanism when it reaches the end of its idle stroke;

Fig. 7 is a sectional plan view at the same line as Fig. 4, showing the charging mechanism in locked position at any point between the machine ends and especially with the charging mechanism on its return stroke;

Fig. 8 is a sectional view taken along the line 8—8 of Fig. 2, showing the air or fluid connections for the mandrel and mold;

Fig. 9 is a sectional elevation taken along the line 9—9 of Fig. 3, illustrating the fluid connections to the pressure cylinder and the timing or trip mechanism therefor;

Fig. 9a is a detail view of the connections for the hydraulic cylinder valve control adjusting mechanism;

Fig. 10 is a front elevational view taken along the line 10—10 of Fig. 5, showing particularly the device for locking the charge feeding mechanism;

Fig. 11 is a sectional elevation taken along the line 11—11 of Fig. 6, showing the relation of parts in the charge feeding unlocking mechanism;

Fig. 12 is a section taken along the line 12—12 of Fig. 2, showing the relation of parts between heads and the means for removing the formed articles from the machine;

Fig. 13 is a sectional plan view taken along the line 13—13 of Fig. 12;

Fig. 14 is a sectional view taken along the line 14—14 of Fig. 2, showing the mechanism for driving the article removing devices;

Fig. 15 is a sectional elevation taken along the line 15—15 of Fig. 14;

Fig. 16 is a sectional elevational view which may be through any one of the heads, showing the relation of parts during the preheating and the final curing stage of operation;

Fig. 17 is similar to Fig. 16 and shows the relation of parts at the completion of the final curing and just prior to moving the preheated charge to the final curing station;

Figs. 18, 19 and 20 are diagrammatic views illustrating one method or cycle of operation in this type of machine;

Fig. 21 is a diagrammatic view of the fluid connections and control for the pressing plungers of the entire machine;

Fig. 22 is a part sectional plan view on line 22—22 of Fig. 23, of a portion of the oven showing the manner in which the head cover plates abut each other and with the insulation omitted;

Fig. 23 is a sectional elevational view through any one of the heads at a point between the head cover plates;

Fig. 24 is a sectional elevation through a head, illustrating a modification in which additional heating elements are supplied;

Fig. 25 is a diagrammatic view of the relation of the heating elements of each head; and Fig. 26 is a section taken along the line 26—26 of Fig. 22, illustrating the relation of the cover plates and their shields.

General description

The method and apparatus contemplated in this invention may be varied in a number of different ways, but for the purpose of illustration and description a specific method and apparatus will be herewith disclosed.

The method concerned herein is new in that it prescribes to the idea of preheating the material in a heated mold prior to the application of pressure for the final forming, and in this particular instance it is contemplated that the preheating of the material be to such a degree that the material particles will have cohesion and be in such a condition that it will amalgamate without flow marks or gas entrapment. In view of this method of forming and curing, it is absolutely necessary that a particularly flexible type of apparatus be employed, otherwise this method cannot be successfully carried out.

The above is particularly pertinent in view of the fact that the application of preheating principles to resinous materials must be accomplished through mechanisms capable of fine and exact control, because these materials have certain inherent characteristics that cause them to become useless if they are under or over cured as to temperature and/or pressure.

The mechanism in general consists of a series of molding or curing mold heads arranged in a straight line and enclosed in an oven or chamber which is heated through the medium of electrical heating elements that are individual to each molding head and controllable individually as to temperature. Each head consists of a table or carrier supporting two or more molds, and within the heated oven this table is arranged for intermittent indexing to bring its molds to charging, preheating and final forming and curing positions in succession. These heads also have individual thereto a forming mandrel and a hydraulic cylinder which incidentally are common to the molds on the head and are arranged in vertical alignment with each other in order that the molds on each table may be brought in alternation to a position for cooperation therewith and then placed under pressure for the final curing step.

The indexing of the mold tables is synchronized with the mechanism for feeding the molding material to the molds as well as with the pressing mechanism.

In the feeding of charges to the molds, a hopper or container for a limited quantity of the moldable material is employed and arranged for travel back and forth along the front of the molding oven or chamber. The movement of this hopper in one direction not only indexes the mold tables, but also causes measured charges of the material to be placed in the molds of each table in succession, while the movement in the opposite direction is merely an idle stroke and has no particular significance except as a means of obtaining a requisite time interval in the molding cycle. However, at the end of this idle stroke the hopper does actuate a mechanism that delivers a predetermined quantity of material from a storage bin to the hopper. This hopper device also carries mechanism which allows adjustment of the time of mold charging relative to mold indexing.

The mechanism which reciprocates the hopper is connected to two cam shafts, one for controlling the hydraulic pressing cylinders and one which controls the application of air or fluid to the mandrel for cooling and to the mold for cleaning. This first mentioned cam shaft has mechanism thereon which allows the proper sequential timing of the several operations of each molding head, as well as the sequence of operation of the heads relative to each other. Likewise, the second cam shaft allows the proper sequential timing of the application of air or fluid to each molding mandrel and mold.

The removal of the molded articles from the machine is an operation that can be definitely set with respect to the stripping of the mold from the formed article and, therefore, does not require adjustment. The article removal is accomplished by means of a rotating disk which is actuated by the withdrawal of the pressing plunger from the mold at the pressing position.

The machine herein disclosed consists primarily of a framework or base 20, superimposed upon which is a head casting 21 forming an oven or chamber for a series of forming or curing molds 22.

At one end of the frame 20 is mounted a bracket 23 for supporting a hydraulic driving power unit 24, said unit being of the ordinary commercial type and in turn driven by an electric motor 25. This unit 24 is of the variable speed type in order that any desired driving speed may be obtained.

Attached to the power unit drive shaft is a horizontal drive shaft 30 which is continuously rotated and has formed in its periphery and throughout its length, right and left spiral screw threads or slots 31 and 32, respectively, these slots interconnected at each end of the shaft 30 by a semi-circular slot 19. The rotation of the shaft 30 supplies, through slots 31 and 32, means for moving a material container or hopper 33 to and fro along the front of the machine, as well as supplying the actuating power for other operations of the machine.

At one end of the shaft 30, which is supported in brackets or extensions 34 of the head casting 21, is a sprocket 35 connected to another sprocket 36 on a cam shaft 37 by a chain drive 38, forming thereby an interconnected drive for the movable parts of the machine, and provides means through which the series of molding heads and their actuating mechanisms may be caused to function in proper sequence, as will be hereinafter described.

*Charging mechanism*

The charging mechanism consists of a hopper or material container 33 (Figs. 1 and 3) of a size sufficient to carry at least enough material to insure filling a complete set of molds, thus eliminating the need of transporting large quantities and weights. This hopper is mounted upon a slide 40, said slide being carried in horizontal slideways 41 formed on one side of the head casting 21. Formed in this slide 40 beneath the hopper 33 and at right angles to the slide 40, is a slideway 42 which retains the charge transferring member 43 and serves to guide said member 43 between a charging position beneath the hopper 33 to a discharging position over a forming mold 22.

The slide 40 has a depending bracket 44 which is slidably adjustable in slideways 39 on the slide 40 by means of a screw 45, for the purpose of changing the position of the slide 43 lengthwise of the slide 40 to cause the charging member 43 to reach the charging position earlier or later. Thus, we can change the time of presentation of the charge to the molds, especially in relation to their indexing. This adjustment allows control of the time interval of retention of the charge in the mold 22 in advance of the actual forming operation and thereby control the preheat period of the molding material.

For ease of assembling and disassembling, the bracket 44 may be formed in two parts 44ª and 47 clamped around bushings 46 which ride on the shaft 30. These bushings have lug extensions 48 (Fig. 16) which project into the spiral threads 31 and 32, thus causing the slide 40, through rotation of shaft 30, to move to and fro across the front of the machine and present the charging device in succession to the various molding heads. The spiral threads 31 and 32 are connected at each end by the semi-circular groove 19 to allow a change in direction of movement of the slide 40, said groove 19 being so designed that the slide has but a slight pause during the changing of its direction of movement. This is conventional structure.

In order to control the charging member 43 in its charging strokes, a cam 50 is provided, said cam being attached to the front of the casting 21 and having formed therein a series of depressions 49 (Figs. 7 and 11), each located at a definite position (horizontally) relative to the mold to which it may be assigned.

A horizontal lever 51 fulcrumed on a pivot pin 52 in an extension 53 of the slide 40, is connected to charging member 43 by a link 54 and carries a cam roll 55 positioned to ride upon cam 50 and adapted to be held thereagainst by a spring 56 (see Fig. 6).

Inasmuch as the slide 40 is connected to the continuously rotating spiral screw shaft 30, it must, therefore, move continuously in either direction, and as it moves to the right in Figs. 1, 4 and 5, the cam roll 55 will drop into the depressions 49, projecting the charging member 43 from the position shown in Figs. 5 and 6 through openings 57 in the oven 21, to that shown in Fig. 2 or Fig. 4, thus carrying a measured charge of moldable material from the hopper to the mold 22. This projecting movement of the member 43 pushes the door 58 inwardly about its hinge pin 59, and as the member 43 is retracted the spring 60' will automatically close the door 58. One of these doors is provided for each head of the machine. As the slide 40 continues on its way, the cam roll 55 will ride up the incline 60 of the depression 49 and bring the member 43 to the position shown in Figs. 5 and 6, where it will again receive a charge of molding material in its cavity 61, by being aligned with the opening 62 in the hopper 33.

In order to insure movement of the material through the opening 62 of the hopper 33 (Fig. 2), agitators 63 are provided, each of these being formed in the shape of a spiral screw.

The opening 64 in the hopper, through which the agitators 63 project, is shaped to correspond to the spiral of the agitators in order that a rotative motion may be imparted to the agitators simply by projection thereof into the hopper. In order to project and rotate these, a lug 65 (Fig. 4) is provided on member 43, said lug being arranged to contact the agitator head 66 on its forward stroke, and a spring 67 provides the retractive power for the agitators. Thus, every feeding of a charge provides agitation of the material, insuring an adequate delivery of material to the charge member 43.

Due to the fact that the container 33 delivers charges of material while moving in one direction and is idle when moving in the opposite direction, it is necessary that provision be made for definitely controlling these operations. This has been accomplished by providing a locking detent 70 mounted in the extension 53, said detent being so located that when the hopper reaches the end of its charging stroke the detent is actuated by a stationary cam 71 which forces the detent 70 down into the path of arm 51 when said arm is retracted to thus retain it in the outer position shown in Figs. 5 and 7 where it has been positioned by cam 50.

This cam 71 is of sufficient length to allow the hopper slide 40 to continue its movement to the end of shaft 30 and thread 31 reaching the connecting semi-circular thread 19, thereby shifting the direction of motion through thread 32 and starting the return or idle travel of the container 33. When the hopper or container approaches the end of its idle or return stroke, a forked cam 72 (Fig. 4) rides under the button head of detent 70, raising it out of the path of arm 51, and releasing said arm to the control of cam 50. The slide 40 continues its travel until it reaches the thread connecting a second semi-circular groove 19 where the thread action is again shifted to reverse the direction of slide movement.

At this time the hopper 33 automatically receives a fresh supply of moldable material by means of its contact with the finger or shutter 75, which trips it and allows a quantity of material to flow from the bin 76, the amount being controlled by the period of time the hopper remains thereunder, or manually as is desired.

A further element of importance in the feeding or charging mechanism is the provision of means whereby accurately measured charges may be obtained. This is accomplished by making the feed member 43 in two parts which are adjustable relative to each other by means of an adjustable screw 77 arranged between the member 43 and its inner adjustable part 78. This allows the capacity of the cavity 61 to be varied and regulated to thus insure the proper quantity of material, or if pellets are being used, it may be adjustable to fit the pellet.

A number of different material feeding cycles may obtain in this machine, but the preferred form is diagrammatically illustrated in Figs. 18, 19 and 20 and will be described presently.

One of the outstanding features in this machine is the provision of a condition whereby a measured charge of moldable material may be supplied to a heated mold, this charge being retained in the mold for a predetermined and controllable period of time in order that it may be preheated to a degree that will not be detrimental to the final formation and curing of an article under pressure and heat. Referring to Fig. 18, there is shown in diagram the beginning of the machine operation in so far as the feeding of material is concerned. In operation, the hopper 33, shown at the left in dotted lines, moves in the direction of arrow A, and as it passes each molding station a charge of moldable material is deposited in one of the molds.

The movement of parts taking place at this time is illustrated at station 5 of the diagram in Fig. 18, which brings out that the mold table 80 carrying the molds 22 is being indexed prior to the reception of a mold charge on that table and prior to hopper registration with that table and mold. This same movement takes place on each individual head, that is, the table carrying the mold about to be charged always indexes just prior to reception of a charge by said mold. Thus, it should be apparent that as the hopper reaches the end of its first complete movement in the direction of arrow A, all of the mold tables will have been indexed and one mold $A^2$ of each table will have received a charge of molding material. Further, due to the fact that the mold table 80 is not indexed on the return stroke of the hopper 33, the mold $A^2$ that has been charged will remain at the charging position during the time that the hopper travels to the end of the machine on its charging stroke and then returns on its idle stroke to the initial dotted line position, the time interval required for this being, of course, controllable by the adjustment of the hydraulic power unit 24 illustrated in Fig. 1. This time interval may also be further regulated by the provision of a spiral groove in the shaft 30, having a different pitch for the return of the hopper from that of the thread which moves the hopper on its charging stroke. Continuing and considering the hopper in the dotted line position shown in Fig. 19 and ready to proceed to the second step of its operation in the starting of the machine, it will be noted that, as previously described, each mold table 80 is indexed prior to the reception of a charge in a mold. Therefore, with the hopper 33 in the full line position shown in Fig. 19 and moving in the direction of the arrow B, the previously charged mold $A^2$ will be indexed, bringing an empty mold $B^2$ to the charging position where it then receives a charge, with this same action happening in succession as the hopper continues moving in the direction of arrow B. When the hopper reaches the end of its charging stroke and automatically starts on its return movement, a condition exists wherein all of the molds ($A^2$ and $B^2$) have received charges of the moldable material. From this point on the charging is simply a duplication of the above described operations. It should be apparent, in view of the above, that there is always a charged mold standing in a zone of low temperature (charging position) for a predetermined period of time in order that a charge may always be preheated in its forming mold prior to being presented to other positions in the molding head for final completion.

*Molding mechanism*

The molding mechanisms in this machine are identical throughout the series of molding heads. Therefore, the description of the operation of this mechanism will in the main be confined to a single molding head.

A molding head, consisting of a table 80 mounted for rotation in the head casting 21, has attached on the lower central face thereof a cylindrical bearing or shaft extension 81. Attached by a key 82 to the lower end of shaft 81 is a bevel pinion 83. Meshing with this pinion is a second bevel gear 84 mounted on and attached to a horizontal shaft 85 and supported in a bracket 90 attached to the lower side of the head casting 21. Permanently attached to the shaft 85 by means of a key 86 is a driving member 91, said driving member formed with internal indexing or ratchet teeth 92 on its inner periphery. Alongside of this driving member and freely mounted upon the shaft 85 is a positive drive sector gear 93, said gear having a ratchet pawl 95 attached to its inner face, said pawl being held against the ratchet teeth 92 of member 91 by means of a flat spring 96. This sector gear 93 is held in position by means of a collar 97 pinned to the shaft 85. In order to drive these various gears, a rack 100, attached to the lower face of slide member 47 forming a part of the feeding mechanism slide 40 is arranged to mesh with the sector gear 93 during the movement of the slide 40 to and fro along the front of the machine with the material hopper 33. Referring to Figs. 1 and 3, it will be noted that when the feeding mechanism or slide 40 is moving to the right, the rack 100 will engage the teeth of the sector gear 93, causing this gear to rotate clockwise, this rotation in turn causing the indexing member 91 to rotate clockwise due to the meshing of the pawl 95 with the ratchet teeth 92. This motion is transmitted through the bevel gears 83 and 84, thus causing the mold table 80 to rotate 180° and reverse the position of the molds, that is, cause moving of one mold from a charge receiving position to a charge forming and curing position, while the other moves from the charge forming and curing position to the charge receiving position.

It will be noted that when the motion of the slide 40 is reversed and it moves to the left (Figs. 1 and 3), the rack 100 meshes with the sector gear 93 and this gear will be rotated counter-clockwise and the ratchet pawl 95 will be ineffective. Thus, no motion will be imparted to the drive shaft 85 upon the reverse movement of the slide 40 and rack 100.

However, to insure that the drive shaft 85 is not moved from its previously indexed position (see Figs. 2, 16 and 17), a locking detent 101 is utilized, said detent being projected into conical openings 102 in the member 91 by means of a spring 103 mounted in bracket 90. An adjusting screw 104 supplies a means whereby tension through spring 103 to detent 101 may be regulated. In view of the fact that the index motion is limited to 180°, it is only necessary that two locking openings 102 be provided in the driving member 91. However, more than two molds may be utilized on each table 80 which would necessitate more openings 102 and the changing of rack 100 to a suitable size.

In order that the indexing of the tables may be properly coordinated, the rack 100 is formed with a dovetail tongue 110 mounted in a dovetail slot 111 formed in the lower portion 47 of the slide member 40. This construction allows the positioning of the rack 100 lengthwise of slide 40 in any desired manner, that is, it may be arranged to slightly precede the hopper 33 or succeed the hopper 33 as desired.

This adjustment, in combination with the adjustment previously described in connection with the charging mechanism, allows the obtaining of a cycle of operation of any desired character and the proper coordination of the charging mechanism and the indexing mechanism to thereby control the time interval of charging relative to indexing of the molds as well as the control of the time interval that the charge is being preheated in the mold.

After a mold 22 has been charged and indexed, it will then be in a position which allows it to cooperate with a forming mandrel 120, said mandrel being mounted in a boss formation 121 of the head casting 21. This mandrel is formed with screw threads 122 which allow it to be locked into the boss 121 and has a shank projection 123 extending through an opening 124 in said boss, thus allowing for an accurate vertical alignment of said mandrel relative to the mold 22 therebelow. The lower end of the mandrel has a projection 125 which may be shaped to conform to any desired interior design of the article to be formed, but in this particular instance is formed with external screw threads which will cause the formation of internal screw threads on the article being produced.

When the mold table 80 indexes, bringing a mold 22 to the forming and curing position, it is accurately secured in this position by means of the locking member 101 of the indexing mechanism previously described, and in this position it is also in alignment with a pressure applying member 126. This member has a tapered conical-shaped end 127 arranged to fit into a similarly shaped cavity 128 formed in the molds 22. The member 126 is provided with a key 129 which rides in a keyway 130 formed in the casting 21. When the table 80 comes to rest after being indexed, a keyway 131 formed therein is brought into alignment with the keyway 130 formed in the casting 21, thus providing a condition of registration when the member 126 projects vertically upward through opening 132 in table 80, bringing its key 129 into the keyway 131, locking the tables 80 with head 21 in exact registration with the mandrel 120, and insuring that the mold 22 will be in perfect alignment with said mandrel during the forming and curing operations.

In order to insure the seating of the mold 22 on the member 126, there is provided a forked member 135 having a downwardly tapered portion 136, said member extending partially around the mold 22 and seating upon the tapered shoulder 137 of the mold, thereby locking said mold between this member and the member 126. This fork 135 is welded as at 138 to a tubular shaft 139, said shaft being mounted in an opening 141 formed in the table shaft 81. A spring 142 rests on a shoulder 143 of the shaft 139 and is held in position by a screw cap 144 threaded upon the upper end of member 80. Thus, it will be seen that the pressure of the spring 142 is utilized to hold or retain the fork 135 under tension on the tapered shoulder 137 of the mold 22 and thus clamp the mold between this forked member 135 and the tapered point 127 of the pressing member 126 when the mold is being raised to and from the pressure forming position (Fig. 16).

In this manner the mold is at all times retained in proper position both vertically and horizontally and this member 135 also insures that as the member 126 moves away from the pressure molding position shown in Fig. 16 to the position shown in Fig. 17, the mold will be stripped from the formed article 145 and follow the member 126 vertically downward and seat upon the aligning boss 146 formed on the table 80. Moreover, this member 135 being under spring pressure retains the mold in position on the boss projections 146 during the time that the tables are indexed and prevents both horizontal and vertical motion of said molds relative to the tables.

In order to raise and lower the molds to and from molding and curing positions as illustrated in Figs. 16 and 17, vertically disposed hydraulic cylinders 150 (Fig. 2) have been provided, these cylinders being of the ordinary welded cylinder type and mounted in brackets 151 attached to the frame 20 of the machine. Each cylinder is provided with a piston 152 mounted on a piston rod 153, said piston rod being loosely attached to the member 126 by means of a pin 154. A spring 155 mounted in the cylinder 150 is utilized to cause a downward motion of the piston 152 after it has finished its pressure stroke during the forming operation.

In order to actuate these cylinders 150, a valve mechanism has been provided which consists of a valve 160 connected to a source of hydraulic pressure by a pipe 161 and having a connection 162 with the lower end of the cylinder 150 as well as an exhaust pipe 163 which conveys the previously used operating fluid back to a reservoir (not shown) of the ordinary type used in hydraulic operation. Referring to Fig. 9, it will be noted that the piston 152 is shown on its upward travel, that is, the valve stem 164 is in such position that the hydraulic fluid under pressure has entered through the pipe 161 and passed through the valve chamber 165 to pipe 162 into the cylinder, causing the piston to be moved to its upper position and held under pressure for a predetermined time, thus raising the mold 22 to the position shown in Fig. 16.

The shifting of the valve stem 164 to actuate the cylinders 150 in timed relation is cam controlled and will be described hereinafter. The retraction of the piston 152 is accomplished by shifting the valve stem 164 to bring the chamber 166 into registration with pipes 162 and 163, thus allowing the fluid to return to the hydraulic reservoir through pipe 163. When this valve is shifted, releasing the pressure under the piston 152, a spring 155 becomes active and forces the piston downward, retracting the member 126 and through the action of spring 142 on the stripper yoke 135, the mold 22 is caused to descend and seat upon the projection 146 of the indexing table 80. The descent of the mold at this time causes it to strip itself from the formed resinous article 145.

In order to control the movement of the piston 152 in the cylinders 150 of the various heads on the machine, a cam shaft 37 mounted in brackets 169 attached to frame 20 has been provided and mounted upon this cam shaft are series of pairs of cams, each pair being individual to a head, and controlling in the actuation of the piston 152. In view of the fact that each cam unit for the individual heads is alike, only one will be described.

Mounted on cam shaft 37 is a cam 170 which controls the shifting of the valve stem 164 to a position wherein the pressure is shut off from the cylinder 150. This cam 170 is attached to gear 171 which in turn is loosely mounted on said shaft and held in proper driving position thereon by means of a collar 172 fastened to the shaft by means of a set-screw 173. The control of the valve stem 164 for shifting the piston on its pressure stroke is accomplished by means of a cam 174, said cam being adjustably mounted upon the cam shaft 37 by means of a set-screw 175 in order that the relation of the cam 174 may be accurately set with relation to the rotation of the cam shaft 37 to allow a definite predetermined time setting between the shifting of the valve stem and the indexing of the mold tables. This cam 174 is attached to a bevel gear 176 and interconnected to cam 170 by means of a gear train consisting of bevel gears 176 and 177 and bevel gear 171, this latter permanently attached to the cam 170. The bevel gear 177 is mounted on a hub 180 arranged for free adjusting movement about the shaft 37. This hub is connected by a yoke 181 to an adjusting screw block 182 mounted on an adjusting screw 183, said block centered in the yoke and having sliding connection thereto by means of yoke slots 184 and pin 185. The adjusting screw 183 is mounted for free rotation in a bracket 186 and held in position therein by a retaining pin 187 in a circumferential slot 188. By rotating the screw 183 through hand-wheel 189, the bevel gear 177 will be rotatably shifted about the axis of the shaft 37 to thereby adjust the positions of cams 170 and 174 relative to each other.

By rotating the hand-wheel 189 to the right, the gear 177 may be shifted toward the center of the machine and as the cam shaft 37 is rotating clockwise, the gear 176 will likewise be rotating clockwise and the gear 171 will be moving counter-clockwise, and from this it will be found that gear 177 will be speeded up, thereby shifting the gear 171 counter-clockwise relative to the cam shaft 37 a degree commensurate with the amount of shifting of the gear 177. This will mean that the controlling fingers 190 and 191 on cams 174 and 171, respectively, will move relative to each other about the center of the shaft 37, thus increasing the distance or the number of degrees between these fingers and consequently changing the time interval between the shifting of the valve stem 164 to the operative and inoperative positions with respect to its cylinder 150. By reversing the adjustment of the hand-wheel 189 to that just described, the opposite condition of adjustment will, of course, be obtained.

In order to shift the valve stem 164, a lever 195 and a bell crank 196 have been provided which are fulcrumed on a common shaft 197 mounted in the brackets 198 attached to the machine frame 20. The lever 195 carries a cam roll 200 which runs in engagement with the cam 170 and through the cam finger 191 controls dropping of the piston 152 in order to lower the mold 22 from the pressure forming position. The contact between the valve stem 164 and the lever 195 is by a roll 201 resting upon an extension 202 of the valve stem 164 and having a free connection therewith for the purpose of leaving the valve stem free for further manipulation by the bell crank lever 196 at the proper time and without interference between the two cam actions. The lever 196 is a bell crank type fulcrumed on shaft 197 and is arranged to contact the lower end face 199 of the valve stem 164 by means of a free roll contact 203 and is actuated by the cam finger 190 on cam 174 contacting cam roll 204 of the bell crank 196.

By referring to Figs. 2 and 9, it will be noted that these two levers for shifting the valve stem 164 held in contact with their control cams by means of springs 205 and 206, are of a floating type, that is, one may always be actuated without interference from the other or without possibility of jamming.

With this mechanism just described it is possible to so time the shifting of the valve stem 164 that any desired time interval of retention of the forming mold 22 in the pressure molding position shown in Fig. 16 is obtainable and is adjustable while the machine is in motion. For example, if it is found that the mold is held in the up position, as shown in Fig. 16, for too long a time interval, it is only necessary for the operator to adjust the hand-wheel 189 in the proper direction to shorten this time interval and thus change and regulate the curing cycle or pressure application.

In view of the fact that the cam 174 is adjustable on shaft 37 and cam 170 is free thereon, it is possible to obtain any sort of a predetermined cycle on each individual head and as each head has a similar adjusting unit, it is possible to vary the cycle of operation on one head relative to a cycle of any other head without stopping the machine operation or in any way interfering with the cycle of operation of the entire machine or the individual cycle of each head.

The hydraulic mechanisms utilized in this machine may be any of the well known types that may be purchased in the open market and these have been utilized to obtain a particularly flexible control of the machine mechanisms. For example, referring to Fig. 21, it will be noted that an electric motor 210 drives a hydraulic pump 211 having a main feed line connection 212 including a by-pass valve 213 in order that any excess of fluid may be returned to a collecting reservoir (not shown) by means of the return pipe 214. From the by-pass valve 213 a main feed line 215 leads to a series of pressure control devices 216 and thence to respective control valves 160 for the cylinders 150. From this control valve, pipes 162 lead to the bottoms of the cylinders 150. Pipe 163 returns the used fluid to a collecting reservoir while line 161 connects the pressure control device 216 to the valve 160. The units or controls 216 may be of any standard type and provide a means whereby the fluid flowing through the main feed line 215 to the cylinders 150 may be metered to the cylinder at a predetermined constant rate and pressure, this being governed by the particular setting of the feed control lever 217. In this way the rate of feed and pressure to the individual cylinders on each head may be regulated and controlled at will without interfering with the hydraulics of any of the other individual heads, thus controlling the pressure and at the same time affecting the time interval of pressure application. Further than this, by moving the dial lever 217 of any one of these control units 216 to its off position, any individual head may be cut out of operation without affecting the operations of the other heads.

In the molding of natural or synthetic resins, it is found necessary at times to clean the molds and in some instances it is beneficial to cool the forming mandrel and in order to accomplish these results automatically there is provided means including a cam shaft 220 (Fig. 2) driven from the shaft 30 by a chain 221 connecting a sprocket 222 on shaft 30 and a sprocket 223 on shaft 220, to drive this last mentioned shaft in a definite timed relation with the rotation of shaft 30. Adjustably mounted on the shaft 220 is a cam 224, said cam being arranged to trip the valve stem 225 of a whistle valve 226, allowing compressed air or any other desired fluid to enter from a feed supply pipe 227 to a pipe 228 connected to an annular chamber 230 in the boss formation 121 of the head 21. Leading downward from the annular chamber 230 and spaced circumferentially therein is a series of drilled openings 231 leading into a second annular chamber or orifice 232 formed by the head boss 121 and an annular ring 233. This orifice 232 is so shaped that the air streams will be caused to converge at a point below the mandrel 125 and approximately in the center of the mold cavity 234 of the mold 22 therebelow. Thus, when valve 226 is actuated, the fluid supplied will eject any chips or dust from the mold cavity and at the same time insure the cleaning of the mandrel 125 as well as applying a cooling medium to said mandrel. This same apparatus is provided on each individual head and by adjusting the cam 224 on the shaft 220 through the medium of adjusting screw 235, it is possible to get this application of air or fluid under pressure on each head in the proper desired sequence and for the proper time interval.

When the resinous material has been formed into a completed article and the mold 22 has been withdrawn from molding position as is indicated in Fig. 17, the molded article will be left in position on the forming mandrel 125. In order to remove this formed article, it is necessary to apply force in some shape or form to loosen it from said mandrel and, in this particular instance where a molded cap having an internal screw thread is being formed, this force is applied in the form of rotation through the medium of a disk 240 formed of asbestos or some similar material. This disk is so shaped that as it is rotated in the proper direction, its periphery 241 will contact the outer peripheral surface of the formed cap 145 and cause it to be unscrewed from the mandrel 125. As this force is applied to rotate the cap in a counterclockwise manner, it will be apparent that as the cap unscrews and reaches the lower limit of the mandrel, it will be thrown sideways and, in order to guide this cap as it is thrown, a guard 242 is provided to the left of the center of each mold table. This guard prevents the cap from flying over into the adjacent molding heads and causes it to drop downwardly into a cone-shaped depression 243 from whence it drops through a pipe 244 to a control gate 245. This gate may be actuated by any desired mechanism to discharge these caps therefrom in any preferred manner. In order to actuate the disk 240, a bracket 246 attached by pin 247 to the piston 153 of the cylinder 150 carries in its outer hub formation 250 a sleeve 251, this sleeve being mounted for free rotation in said bracket. In order to retain this sleeve in proper position, a pin 252 projects into a groove 253 formed in the outer periphery of said sleeve. Referring to Figs. 14 and 15, it will be noted that this sleeve is formed on its lower end with a series of ratchet teeth 254, these teeth being engaged by a pawl 255, said pawl pivoted on a pin 256 in extension 257 of hub 250 and held in engagement with the ratchet teeth by means of a spring 258. A vertical shaft 260 supporting at its upper end a disk 240 and extending downwardly through the center of the table 80 is formed at its lower end with a spiral slot 261, said slot having at its upper and lower ends a straight section 262 and 263. Embedded in the sleeve 251 is a pin 264 which projects into the spiral slot 261 of shaft 260, thus providing a sliding engagement between the sleeve 251 and the shaft 260.

Referring to Fig. 2, it will be apparent that as the piston 152 moves downwardly from the position shown, the shaft 260 can not have any vertical movement due to a collar 265 being attached thereto by pin 266, said collar resting upon the roller bearing 267, said bearing supported by an extension bearing 268 of cylinder 150. Due to the contact between pin 264 and the spiral slot 261, the shaft 260 must necessarily revolve. The rotation of shaft 260 when the piston 152 moves downwardly is made possible by the fact that the pawl 255 holds the sleeve 251 from rotation and thus the shaft 260 is forced to rotate in its place. As the piston 152 moves on its upward stroke the pawl 255 becames ineffective and the shaft 260 remains stationary and the sleeve 251 will rotate.

In order that the disk 240 may be moved to a position where it will not interfere with the forming operations during the movement of the mold 22 to forming and curing position, a collar 270 attached to shaft 260 provides a means whereby the bracket 246 near the upper end of its stroke will raise the shaft 260 bodily in its bearings and move the disk 240 to the position shown in Fig. 16. As the movement of the parts is reversed and the bracket 246 moves downward with piston 152, the spring 259 causes the shaft 260 to assume its normal position as in Figs. 2 and 17.

In view of the fact that the spiral slot 261 will give a predetermined and definite amount of rotation to disk 240 and in order to insure the non-interference of said disk with other mechanisms when not in use, it must therefore be definitely positioned relative to said slot 261 and especially shaped as shown in Figs. 4 and 5, with a cut-away portion 271. A set-screw 272 fastens this disk in proper position on shaft 260.

Referring to Figs. 18, 19 and 20, which diagrammatically show one method that may prevail in the feeding and forming of resinous materials in this machine, it should be noted that we have previously in this description disclosed the manner of feeding charges to these molds but at this time this chart will be utilized to illustrate the manner of curing as well as charging the material into the molds. As heretofore explained, the first four stations (Fig. 18) show the molds A² as charged and with the hopper moving to the right on its feeding stroke. As the hopper continues its movement to the right-hand end of the machine, each mold table 80 is indexed 180° prior to the molds receiving a charge and this means that the travel of the hopper to the right-hand end of the machine and back again will then leave the bottom line of molds of Fig. 18 or A² in a charged condition with the upper or inner set empty. As the hopper starts on its second travel to the right from the dotted line position as designated in Fig. 19, each mold table 80 will again index 180° prior to receiving a charge, thus moving the charged molds A² to the position shown in the first four steps of Fig. 19 (which is that illustrated in Figs. 2 and 16) and the molds B² will receive their initial charge of molding material. Therefore, when the hopper has traveled for the second time to the extreme right end of the machine and returned, all the molds on each head will have received charges of material and the first group of charges deposited, namely, A², will have been preheated in the mold during the time interval necessary for the hopper to make the first complete round trip or approximately one-half of the necessary forming cycle. Then they will have been presented to forming mandrel for forming and retained there during the time interval required for the hopper 33 to make its second complete round trip for charging the molds B² and caps 145 will have been completely formed and cured ready for discharge. At this time hopper 33 will have reached the position designated by dotted lines in Fig. 20. Then, as the hopper travels to the right on its third cycle (Fig. 20), the molds A² of the first four stations will be stripped from the formed article 145 at the forming position as indicated in Fig. 17 and the tables 80 will be indexed, bringing molds B² to the forming and curing position. Molds A² will then receive a fresh charge and remain at the charging position for the preheating period which ordinarily is the time interval required for the hopper 33 to make its charging stroke and return. In other words, at this point the original charges in molds A² (Fig. 18) will have been completely formed and cured and the disk 240 will be rotatively contacting the formed article 145 to remove it from the mandrel 125, and the hopper will have again started on its charging motion to recharge molds A² as in Fig. 20.

In order that this cycle of curing and forming may be more easily understood, a description of an actual time cycle will be herewith given. Assuming that an article is being fabricated that requires a time interval of forty seconds, the following conditions will prevail. Starting with the hopper 33 in the dotted line position (Fig. 18), it is necessary to move this hopper a distance equal to that between any two heads in order that #1 table may be indexed. Therefore, as the hopper begins to move, the molds on #1 table must be in the position shown in Fig. 17, and as it requires a movement of rack 100 and hopper 33, as before stated, to index the table 180°, it must, therefore, require a proportionate part of the entire cycle to index the tables, or approximately five-eighths of a second. It is to be understood that the mold tables always index just prior to receiving a charge and, therefore, as the table comes to rest, a charge is simultaneously deposited in a mold thereon by member 43, thus creating the starting point of the time interval necessary for preheating of the charge in the mold. The duration of this preheating interval extends or continues until the hopper has traveled the full length of the machine, returned, and again reached this particular point directly in front of #1 table. After a charge has been delivered to #1 table, the hopper 33, which has a continuous movement along the front of the machine, continues to travel on its way to the extreme right-hand end of the machine, and as it travels it indexes each table and thereafter charges one mold on each indexed table up to and including the last or #11 as per diagram (Figs. 18 to 20, incl.) table and mold. Upon reaching the last table, the hopper travels a slight distance beyond the center line thereof in order to bring the charging member 43 into normal position beneath the hopper outlet 62, locking it in said position, and at the same time this excess travel allows the lug 48 on slide member bushing 46 to complete its travel in the spiral groove 31 of shaft 30, finally reaching the semi-circular groove 19 in said shaft. Upon reaching this semi-circular groove, the hopper starts its return motion therein and then, by entering the spiral groove 32, the hopper is caused to resume its normal speed and to return to its original starting position, as shown by dotted lines in Fig. 19. The time interval required for the hopper to make this complete cycle of travel is approximately twenty seconds or one-half of the curing and forming cycle. This means that the charge dropped in mold A² on #1 table has remained in this mold all of this time and the charges on each successive table will, therefore, each be in their respective molds the same time interval as the hopper reaches its position in front of each mold table. From this it should be apparent that the preheating cycle will be exactly alike on all tables.

The next step after preheating the charge is, of course, to present it to the forming mandrel 125 where it is given its final shape, and in order to do this, the hopper 33 must, of course, start on its next charging stroke, the operation of which will be identical to that described as occurring during its first charging cycle. It should be noted here that when the hopper 33 reaches its charging position directly on the center line of #1 head that the mold first previously charged will by that time have reached the position as designated in Fig. 19 by the symbol A², due to the indexing of the table, this being the forming position. The positioning of the mold A² at this point in the cycle uses up the twenty seconds, and the next twenty seconds of the forming and curing cycle are utilized by moving the mold into pressing position, retaining it in said position and retracting the mold to discharging position. During these last mentioned operations, the hopper 33 will, of course, have traveled to the end of the machine and returned to its initial starting position, and likewise each individual table will have been successively indexed, presenting in succession and timed sequence preheated charges to the forming mandrel. From this description, it will be noted that a forty second preheating and forming cycle prevails on each individual head and that these cycles overlap as between heads, thus giving a condition where articles are brought to final form on each head in succession with seconds or fractions thereof elapsing between the completion of each article on the various heads. It is, of course, understood that the forty second cycle just described is merely an example and it should be further understood that any desired time cycle may be used.

Temperature control

The description of this machine has so far been specifically directed to the mechanical features of the invention, but besides these mechanical features it is necessary that a control of the heat or temperature conditions in this machine be obtainable in order that the curing of these synthetic and natural resins may be properly accomplished. To begin with, the oven 21 is an elongated, enclosed chamber so shaped as to have the least amount of excess space, as well as to conform in some respects to the shape of the individual heads of the machine. This oven is insulated wherever possible with glass wool or some such insulating material 275 and this insulation is retained in position by means of metal side shields 276, top shields 277 and cover shields 278. Electrical heating elements 280 are provided in each head and through a resistance control 281 or rheostat individual to each head, as well as element 280, the temperature may thereby be regulated and balanced throughout the length and width of the oven 21. Mica liners 284 are provided between each element 280 and the walls of the oven 21 in order to protect the said walls as well as act as reflectors of the heat generated by the elements. It will be noted that, with the exception of the modification shown in Fig. 24, these heating elements are positioned on one side only of the oven. Thus, the temperature zone on that particular side will be high, while on the opposite side the temperature will be considerably lower, due to space and intervening mechanisms or objects. However, in order to insure control of the low temperature zone, vents 285 have been provided, and adjustable closures 286 therefor allow regulation of the area of the vents, thereby providing not only a temperature control but the flow of heat to that side of the oven.

In order to provide easy access to each individual head, cover plates 290 (Figs. 22 and 26) are provided in the roof of oven 21 over each head and these plates are individually insulated with insulating material 275 enclosed in shields 278 individual to the cover plates 290. These cover plates are provided with a projecting flange 292 shaped to fit into openings 293 in the head 21 while the insulating shields 278 are so shaped as to overlap the cover plates 290 and form a continuous field of insulation for the roof of the oven 21 such as is indicated in Figs. 22 and 26.

In Figs. 24 and 25, there has been illustrated a modification in structure which allows for heating of the oven 21 along both sides in order to further insure adequate temperature control of the molds in any of their positions. The means for so providing additional temperature control consists in supplying arcuate shaped electric resistant elements 295 individual to the heads and resistance controls 281 or rheostats for each element.

As indicated in Fig. 26, there will then be heating elements 280 and 295 for each mold head, both of which are individually controllable as to temperature and these, in combination with the adjustable vents 285, will provide an adequate control for temperature conditions in each head and throughout the length and width of the oven 21.

These elements 295 are provided with mica shields 296 to protect the metal of the head casting and act as reflectors of the heat.

With the electric controls just previously described, it should be apparent that the range of temperature control throughout the machine may be of any desired type and that the temperature adjacent each individual unit will allow the obtaining of proper pre-heating and curing temperature on each head and mold.

Modifications may be resorted to within the spirit and scope of our invention.

We claim:

1. In a machine for molding organic plastic materials, the combination of a series of molding heads, molds thereon, a container for moldable material, means to bring successive molding heads and said material container repeatedly into charging position with respect to each other, automatic means to transfer a charge from the container to one mold of each head when said container and head assume a charging relationship, and automatic means operable to prevent charging the molds during a subsequent relative positioning of the mold and container.

2. In apparatus of the character described, a chamber having a side wall formed with a series of horizontally aligned feed openings, mold heads arranged within the chamber and corresponding in number to that of the feed openings, a mold on each head, a container for a moldable material common to the mold heads, cam means for effecting relative movement between the container and chamber to thereby bring the container into register with the feed openings in succession, means for transferring a measured quantity of moldable material from the container to each of the molds through said feed openings, mandrels individual to the molding heads, means for bringing the mandrels and molds into cooperative relation and thereby transforming the material into a finished article, and means for heating said chamber.

3. In apparatus of the character described, a chamber having a side wall formed with a horizontal series of feed openings, molding devices arranged within the chamber, means for heating the chamber, a container for moldable material common to all of the molding devices, means for effecting relative movement between the chamber and container whereby the latter is brought into alignment with the feed openings one at a time, a charge transferring device adapted for projection through the feed openings to deliver charges of the moldable material from the container to the molding devices, and means normally closing the feed openings and openable by operation of the charge transferring device.

4. In apparatus for molding organic plastic materials, the combination of a horizontally elongated chamber having a side wall provided with a horizontally extending series of feed openings, molding devices arranged within the chamber and individual to the feed openings, means exterior to the chamber and common to the molding devices for delivering measured charges of moldable material to the molding devices by way of said openings, means for heating the chamber including pairs of electrical heating elements for each molding device, one element of each pair disposed in proximity to one of the feed openings and the other element arranged directly across the chamber from the first element, and means for regulably controlling the temperature of said elements independently of each other.

5. An apparatus for molding articles from organic plastic materials or like moldable materials by the application of heat and pressure comprising in combination a frame, a series of fixed molding heads supported thereon and arranged in straight line formation, molds on each head, a container for the moldable material, means for repeatedly and continuously moving said container past said heads in succession in opposite directions, and means for successively transferring measured charges of said material from said container to the respective mold of each head as said container passes said heads in one direction.

6. An apparatus for molding articles from organic plastic materials or like moldable materials by the application of heat and pressure comprising in combination a frame, a series of fixed molding heads carried thereby, a heating chamber associated with each head, a mold disposed within each heating chamber, a normally closed door opening inwardly into each heating chamber, a container for the moldable material, means for repeatedly and continuously moving said container past said heads in succession, and means for successively opening said doors and for transferring measured charges of said material from said container to the respective mold of each head as said container passes said heads.

7. An apparatus for molding articles from organic plastic materials or like moldable materials by the application of heat and pressure comprising in combination a frame, a series of molding heads carried thereby, a heating chamber associated with each head, a mold disposed within each heating chamber, a container for the moldable material, means for repeatedly and continuously moving said container past said heads in succession, means for successively transferring measured charges of said material from said container to the respective mold of each head as said container passes said heads, forming means individual to each heating chamber and operable therein and synchronized with the movement of said container for successively shaping said charges in said molds into the desired articles after a predetermined period of curing time has elapsed since the charging of said molds, and means independent of the movement of the container for collectively lengthening or shortening said period of curing time.

8. An apparatus for molding articles from organic plastic materials or like moldable materials by the application of heat and pressure comprising in combination a frame, a series of molding heads carried thereby, a heating chamber associated with each head, a mold disposed within each heating chamber, a container for the moldable material, means for repeatedly and continuously moving said container past said heads in succession, means for successively transferring measured charges of said material from said container to the respective mold of each head as said container passes said heads, forming means individual to each heating chamber and operable therein and synchronized with the movement of said container for successively shaping said charges in said molds into the desired articles after a predetermined period of curing time has elapsed since the charging of said molds, and means for individually lengthening or shortening said periods of curing time.

9. An apparatus for molding articles from organic plastic materials or like moldable materials by the application of heat and pressure comprising in combination a frame, a series of molding heads carried thereby, a heating chamber associated with each head, a mold disposed within each heating chamber, a container for the moldable material, means for repeatedly and continuously moving said container past said heads in succession, means for successively transferring measured charges of said material from said container to the respective mold of each head as said container passes said heads, forming means individual to each heating chamber and operable therein and synchronized with the movement of said container for successively shaping said charges in said molds into the desired articles after a predetermined period of curing time has elapsed since the charging of said molds, means for collectively lengthening or shortening said periods of curing time, and means for individually lengthening or shortening said periods of curing time.

10. An apparatus for molding articles from organic plastic materials or like moldable materials by the application of heat and pressure comprising in combination a frame, a series of molding heads carried thereby and arranged in straight line formation, a heating chamber associated with each head, a mold disposed within each heating chamber, a container for the moldable material, means for repeatedly and continuously moving said container past said heads in succession in opposite directions, means for successively transferring measured charges of said material from said container to the respective mold of each head as said container passes said heads in one direction, a forming mandrel in each heating chamber, and means individual to each heating chamber and synchronized with the movement of said container for successively moving said molds bodily into forming engagement with said mandrels to shape the charges therein into the desired articles after a predetermined period of curing time has elapsed since the charging of said molds.

11. An apparatus for molding articles from synthetic resins or like moldable materials by the application of heat and pressure comprising in combination a frame, a series of molding heads carried thereby, a heating chamber associated with each head, a mold disposed within each heating chamber, a container for the moldable material, means for repeatedly and continuously moving said container past said heads in succession, means for successively transferring measured charges of said material from said container to the respective mold of each head as said container passes said heads, a forming mandrel in each heating chamber, means individual to each heating chamber and synchronized with the movement of said container for successively moving said molds bodily into forming engagement with said mandrels to shape the charges therein into the desired articles after a predetermined period of curing time has elapsed since the charging of said molds, means for individually varying the length of time said molds remain in forming engagement with said mandrels, means for collectively lengthening or shortening said periods of curing time without adding to or detracting from the respective lengths of time said molds remain in forming engagement with said mandrels, and means for individually lengthening or shortening said periods of curing time without adding to or detracting from the respective lengths of time said molds remain in forming engagement with said mandrels.

12. An apparatus for molding hollow internally threaded articles from synthetic resins or like materials by the application of heat and pressure comprising in combination a frame, a series of molding heads carried thereby, a heating chamber associated with each head, a mold disposed within each heating chamber, a container for the moldable material, means for repeatedly and continuously moving said container past said heads in succession, means for successively transferring measured charges of said material from said container to the respective mold of each head as said container passes said heads, a forming mandrel in each heating chamber, means individual to each heating chamber and synchronized with the movement of the container for successively moving said molds bodily into forming engagement with said mandrels to shape the charges therein into the desired articles after a predetermined period of curing time has elapsed since the charging of the molds, means for withdrawing said molds from such forming engagement, and rotary means operable upon such withdrawal of said molds and actuated by said mold moving means for spinning the formed articles from said mandrels.

13. An apparatus for molding articles from organic plastic materials or like moldable materials by the application of heat and pressure comprising in combination a series of molding and heating heads, a mold disposed within each head, a container for the moldable material, means for repeatedly and continuously moving said container and heads relative to each other in such a manner that said container and each individual head in succession pass each other identically as to orientation and rate of speed in passing, means for successively transferring measured charges of said material from said container to the respective mold of each head as said container and the head pass each other, a forming mandrel in each head, means individual to each head and synchronized with the relative movement between the container and heads for successively moving said molds bodily into forming engagement with said mandrels to shape the charges therein into the desired articles after a predetermined period of curing time has elapsed since the charging of said molds, means individual to each head for withdrawing said molds from such forming engagement, means individual to each head and synchronized with the relative movement between said container and heads for permitting said withdrawal means to become operative, and means for individually advancing or retarding the precise moment when said last mentioned means becomes operative to individually vary the length of time during which said molds are in forming engagement with said mandrels.

14. An apparatus for molding articles from organic plastic materials or like moldable materials by the application of heat and pressure comprising in combination a series of molding and heating heads, a heating chamber associated with each head, a mold disposed within each heating chamber, a container for the moldable material, a carriage upon which said container is mounted, means for repeatedly and continuously moving said carriage with said container thereon past said heads in succession, a charging member mounted on said carriage and movable from a position beneath said container to a position in alignment with each mold as said container passes said heads in succession to transfer material from said container to said molds, a cam track coextensive with said series of heads, there being a cam recess in said track in the vicinity of each head, a cam member carried by said charging member engaging said track, said track maintaining said charging member in position beneath said container, said recesses permitting said charging member to move into position in alignment with successive molds as said carriage passes said heads, and means within said heads for forming said charges in said molds into the desired articles.

15. In an apparatus for molding articles from organic plastic materials or like moldable materials by the application of heat and pressure, a series of molding and heating heads, a mold carriage disposed within each head, a plurality of molds positioned on each carriage, a container for the moldable material, means for repeatedly and successively moving said container past said heads in succession, means for successively transferring measured charges of said material from said container to a point within each head as said container passes said heads, and means synchronized with the movement of said container for indexing said mold carriages successively to bring the molds carried thereby successively into position at said point to receive a charge of said material.

16. In an apparatus for molding articles from organic plastic materials or like moldable materials by the application of heat and pressure, a series of fixed molding and heating heads, a movable mold carriage disposed within each head, a pair of molds positioned on each carriage, a container for the moldable material, means for repeatedly and successively moving said container past said heads in succession, means for successively transferring measured charges of said material from said container to a point within each head as said container passes said heads, a forming mandrel in each head, the molds of each head being movable with their respective carriages from a charge receiving position to a position in alignment with the respective forming mandrel in the head, and means synchronized with the movement of said container for successively indexing said mold carriages to interchange the position of the molds thereon.

17. In an apparatus for molding articles from organic plastic materials or like moldable materials by the application of heat and pressure, a series of fixed molding and heating heads, a movable mold carriage disposed within each head, a pair of molds positioned on each carriage, a container for the moldable material, means for repeatedly and successively moving said container past said heads in succession, means for successively transferring measured charges of said material from said container to a point within each head as said container passes said heads, a forming mandrel in each head, the molds of each head being movable with their respective carriages from a charge receiving position to a position in alignment with the respective forming mandrel in the head, means synchronized with the movement of said container for successively indexing said mold carriages to interchange the position of the molds thereon, and means for individually advancing or retarding the indexing of said mold carriages.

18. In an apparatus for molding articles from synthetic resins or like moldable materials by the application of heat and pressure, a series of molding heads, a heating chamber associated with each head, a mold disposed within each heating chamber, a container for the moldable material, means for transferring measured charges of said material from said container successively to each mold, forming means individual to each heating chamber and operable therein and synchronized with the transferring means for successively shaping said charges in said molds into the desired articles after a predetermined period of time has elapsed since the charging of said molds, and means individual to each head for regulating the temperature of its respective heating chamber.

19. In a machine for molding resinous materials, a series of molding heads, a series of molds on each head, means for successively moving the molds of each head from a charging position to a forming position and vice versa, means for periodically charging the molds of each head, means for periodically forming the charges in said molds into the desired articles, and adjustable means individual to each head and independent of the charging means for varying the time interval between the charging of the molds thereof and the formation of the charges therein into the desired articles.

20. In a machine for molding organic plastic materials, the combination of a frame, a series of molding heads thereon, each head including a rotary table, a pair of molds on each table, a charging device for the molds of each head common to all of the heads, means to move and actuate said charging device, a forming mandrel individual to each head and adapted to successively cooperate with the molds of each table, and means synchronized with the movement of the charging device for periodically rotating said tables to bring the molds thereon successively into forming alignment with said mandrel.

21. In a machine for molding organic plastic materials, the combination of a frame, a series of molding heads thereon, each head including a pair of movable molds, a charging device for the molds of each head common to all of the heads, means to move and actuate said charging device, a forming mandrel individual to each head and adapted to successively cooperate with the molds of each head, means synchronized with the movement of the charging device for moving said molds and mandrel relative to each other to bring the same into forming alignment.

22. In a machine for molding organic plastic materials, the combination of a frame, a series of molding heads thereon, each head including a pair of movable molds, a charging device for the molds of each head common to all of the heads, means to move and actuate said charging device, a forming mandrel individual to each head and adapted to successively cooperate with the molds of each head, means synchronized with the movement of said charging device for moving said molds and mandrel relative to each other to bring the same into forming alignment, and means for varying the timed relation between the actuation of said charging device and the movement of said molds.

23. In a machine for molding organic plastic materials, the combination of a frame, a series of molding heads thereon, each head including a pair of movable molds, a charging device for the molds of each head common to all of the heads, means to move and actuate said charging device, a forming mandrel individual to each head and adapted to successively cooperate with the molds of each head, means synchronized with the movement of the charging device for moving said molds and mandrel into cooperating forming engagement, and means operable while the machine is in motion for varying the timed relation between the actuation of said charging device and the movement of said molds.

24. In a machine for molding organic plastic materials, the combination of a frame, a series of molding heads thereon, each head including a pair of movable molds, a charging device for the molds of each head common to all of the heads, means for moving and actuating said charging device, a forming mandrel individual to each head and adapted to successively cooperate with the molds of each head, means synchronized with the movement of the charging device for moving said molds and mandrel relative to each other to bring the same into forming alignment, and means for advancing or retarding the actuation of said charging device with respect to the movement of said molds to thereby vary the duration of the molding cycle.

25. In a machine for molding organic plastic materials, a series of molding heads, a mold for each head, a container for moldable material, means for bringing each head and container repeatedly into relative position whereby the mold thereof may be charged from the container, automatic means for transferring a charge of the material from said container to the respective mold of each head when said head and container occupy such relative position, and automatic means operable to render said transferring means inoperative during a subsequent such relative positioning of each molding head and the container.

26. In a machine for molding comminuted resinous materials, a series of molding heads, a rotary mold table individual to each head, a pair of molds on each table, a forming mandrel individual to each head and common to the molds thereof, means for successively indexing said tables to successively move the molds thereon from a charging zone to a forming zone, means common to all of the heads for charging the molds when the latter are in their respective charging zones, and means for successively moving the molds of each head into forming engagement with the mandrel thereof when the molds are in their respective forming zones.

27. In a machine for molding comminuted resinous materials, a series of molding heads, a rotary mold table individual to each head, a pair of molds on each table, a forming mandrel individual to each head and common to the molds thereof, means for successively indexing said tables to successively move the molds thereon from a charging zone to a forming zone, means common to all of the heads for charging the molds when the latter are in their respective charging zones, and means for successively moving the molds of each head and the mandrel thereof relative to each other to cause forming cooperation therebetween when the molds are in their respective forming zones.

28. In a machine for molding comminuted resinous materials, a series of molding heads, a rotary mold table individual to each head, a pair of molds on each table, a forming mandrel individual to each head and common to the molds thereof, means for successively indexing said tables to successively move the molds thereon from a charging zone to a forming zone, means common to all of the heads for charging the molds when the latter are in their respective charging zones, and hydraulic means for successively moving the molds of each head and the mandrel thereof relative to each other to cause forming cooperation therebetween when the molds are in their respective forming zones.

29. The process of continuously forming articles from comminuted organic plastic materials which consists in successively segregating measured charges of moldable material from a single supply body thereof and delivering them successively to a series of heated molds in respective charging zones of relatively low heat, successively moving the heated and charged molds to respective forming zones of relatively high heat and applying pressure to the material in said latter zones while simultaneously segregating additional charges successively from the supply body and delivering them to a second series of heated molds in the respective charging zones, successively removing the formed articles from the first series of molds, and successively moving the second series of heated and charged molds to the respective forming zones while simultaneously and successively returning the empty molds of the first series to the respective charging zones and continuing the process in overlapping cycles of predetermined duration.

30. In apparatus for molding organic plastic materials, a heated chamber, a plurality of molding heads therein, each head including a mold carrier mounted for rotation about a vertical axis, a plurality of molds on each carrier, a mandrel common to the molds of each mold carrier, means for imparting intermittent rotary movement successively to the mold carriers to thereby place the molds thereof alternately in a charging position and in a pressing position in proximity to their respective mandrel, automatic means common to the molding heads for delivering a measured charge of moldable material to one mold of a carrier at its charging position, and means operable simultaneously with the charging of said mold for pressing and thereby transforming a charge in another mold of the same carrier to the final shape of the articles being produced.

31. An apparatus for molding articles from synthetic resins or like moldable materials by the application of heat and pressure comprising in combination a frame, a series of fixed molding heads supported thereon, each head including a mold, each mold having one or more mold cavities, a container for the moldable material, means for repeatedly and continuously moving said container past said heads in succession, and means for successively transferring measured charges of said material from said container to the cavity or cavities of the respective mold of each head as said container passes said heads.

32. An apparatus for molding articles from synthetic resins or like moldable materials by the application of heat and pressure comprising in combination a frame, a series of fixed molding heads supported thereon, each head including a mold, a container for the moldable material, means for moving said container past said heads in succession, and means operable upon such movement of said container for successively transferring from the container to said heads for delivery to said molds measured quantities of moldable material which are proportional to the capacities of said molds.

33. An apparatus for molding articles from synthetic resins or like moldable materials by the application of heat and pressure comprising in combination a frame, a series of molding heads carried by said frame, a heating chamber associated with each head, a mold disposed within each heating chamber, a hopper for the moldable material including a charging spout, means for continuously moving the discharge spout past said heads in succession, means for successively transferring a measured charge of the material from the spout to the respective mold of each head as the spout passes said heads, a forming mandrel in each heating chamber, means individual to each heating chamber and synchronized with the movement of the spout for successively moving said molds bodily into forming engagement with said mandrels to shape the charges therein into the desired articles after a predetermined period of curing time has elapsed since the charging of the molds, and means for varying the length of time said molds remain in forming engagement with said mandrels.

JOHN RALPH HOGE.
LEONARD D. SOUBIER.